US008123621B2

(12) United States Patent
Shimabukuro et al.

(10) Patent No.: US 8,123,621 B2
(45) Date of Patent: Feb. 28, 2012

(54) STORING DATA IN WAGERING GAME SYSTEMS

(75) Inventors: Jorge L. Shimabukuro, Las Vegas, NV (US); Jun Wang, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 561 days.

(21) Appl. No.: 12/376,501

(22) PCT Filed: Aug. 16, 2007

(86) PCT No.: PCT/US2007/018073
§ 371 (c)(1),
(2), (4) Date: Feb. 5, 2009

(87) PCT Pub. No.: WO2008/021402
PCT Pub. Date: Feb. 21, 2008

(65) Prior Publication Data

US 2010/0016066 A1 Jan. 21, 2010

Related U.S. Application Data

(60) Provisional application No. 60/822,664, filed on Aug. 17, 2006.

(51) Int. Cl.
*A63F 13/00* (2006.01)
*A63F 9/24* (2006.01)
*G06F 17/00* (2006.01)
*G06F 19/00* (2011.01)

(52) U.S. Cl. ........................................................ 463/43

(58) Field of Classification Search ..................... 463/43
See application file for complete search history.

(56) References Cited

U.S. PATENT DOCUMENTS 6,055,604 A 4/2000 Voigt et al.
6,132,315 A 10/2000 Miyamoto et al.
2010/0248819 A1* 9/2010 Shimabukuro et al. ......... 463/25
2011/0183763 A1* 7/2011 Bytnar et al. .................. 463/43

OTHER PUBLICATIONS

"International Search Report and Written Opinion for International Application Serial No. PCT/US2007/018073, mailed Aug. 8, 2008," 9 pgs.

* cited by examiner

*Primary Examiner* — Thien F Tran
(74) *Attorney, Agent, or Firm* — Schwegman, Lundberg & Woessner, P.A.

(57) ABSTRACT

Systems, methods, and apparatus for storing wagering game data are described herein. In one embodiment, an apparatus includes a wagering game unit configured to begin presentation of a wagering game and to request that wagering game data be stored. The wagering game can also be configured to wait for an indication that the wagering game data has been stored, and, after receipt of the indication, to resume presentation of the wagering game. The apparatus can also include a non-volatile random access memory (NVRAM) configured to store the wagering game data. The apparatus can also a hard disk drive configured to store the wagering game data. The apparatus can also include a storage controller configured to direct storage of the wagering game data in the NVRAM in response to the wagering game unit's request, to provide to the wagering game unit an indication that the wagering game data has been stored, and to direct storage of the wagering game data to the hard disk drive.

19 Claims, 12 Drawing Sheets

STORING DATA IN WAGERING GAME SYSTEMS

This patent application is a U.S. National Stage Filing under 35 U.S.C. 371 from International Patent Application Serial No. PCT/US2007/018073 filed Aug. 16, 2007, published on Feb. 21, 2008, as WO 2008/021402 A2 and republished as WO 2008/021402 A3 which claims the priority benefit of U.S. Provisional Patent Application Ser. No. 60/822,664 filed Aug. 17, 2006 and entitled "STORING DATA IN WAGERING GAME SYSTEMS", which applications are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, WMS Gaming, Inc.

FIELD

Embodiments of the inventive subject matter relate generally to wagering game systems, and more particularly, to storing data in wagering game systems.

BACKGROUND

Wagering game machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

The present invention is illustrated by way of example and not limitation in the Figures of the accompanying drawings in which.

DESCRIPTION OF THE EMBODIMENTS

This description of the embodiments is divided into five sections. The first section provides an introduction to embodiments of the invention, while the second section describes an example wagering game machine architectures. The third section describes example operations performed by some embodiments and the fourth section describes an example wagering game machine. The fifth section presents some general comments.

Introduction

This section provides an introduction to some embodiments of the invention.

During normal operation, wagering game machines generate and process data necessary for determining wagering game results, payouts, system integrity, and other critical operations. Because wagering game machines need certain data to function properly, wagering game regulators typically have strict rules about how wagering game machines store critical wager gaming data (e.g., data needed to determine a game's outcome, payout, etc.). For example, in some jurisdictions, regulators do not allow wagering game machines to write critical wager gaming data (hereinafter referred to as "critical data") to hard disk drives. Instead, some regulators require that wagering game machines store their critical data in non-volatile semiconductor memory devices because these devices are typically less prone to data loss associated with power loss. As a result, some regulators may cause wagering game machines to use larger non-volatile semiconductor memory devices to accommodate growing critical data sets.

Some embodiments of the invention enable wagering game systems to store critical data on hard disk drives in ways that are resistant to data loss associated with power outages, component failures, etc. One such embodiment writes critical data to a non-volatile semiconductor memory device and then copies the device's contents to a hard disk drive. The following discussion of FIG. 1 describes this and other embodiments.

Figure 1:
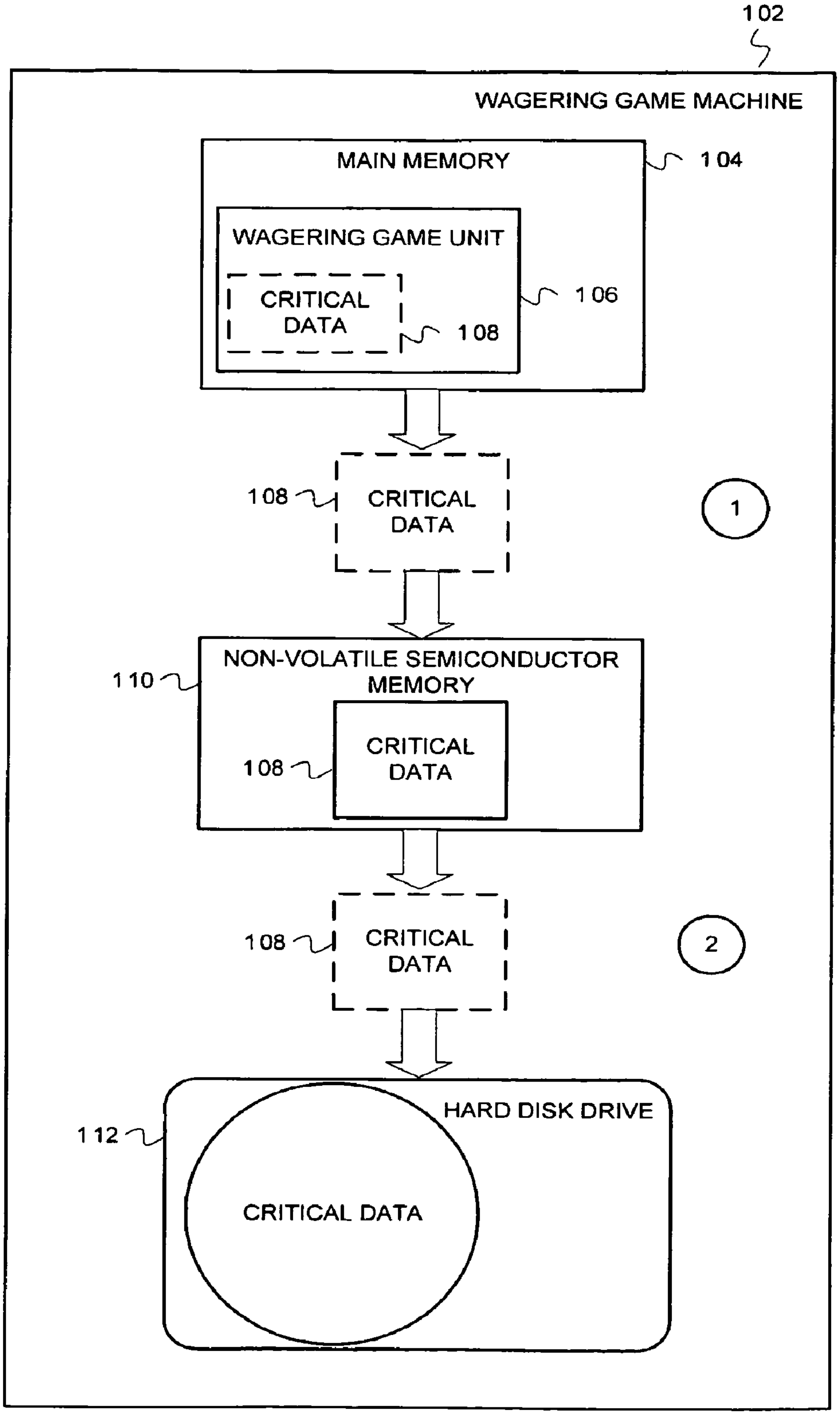
FIG. 1 is a dataflow diagram illustrating dataflow and operations associated with storing critical data on a wagering game machine's non-volatile semiconductor memory device and hard disk drive, according to embodiments of the invention.

FIG. 1 is a dataflow diagram illustrating dataflow and operations associated with storing critical data on a wagering game machine's non-volatile semiconductor memory device and hard disk drive, according to embodiments of the invention. In FIG. 1, the wagering game machine 102 includes a main memory 104, which includes a wagering game unit 106 for conducting wagering games and processing critical data. The main memory 104 is a volatile storage device (i.e., its contents will be lost upon power loss). The wagering game machine 102 also includes non-volatile semiconductor memory 110 and a hard disk drive 112.

In FIG. 1, the dataflow occurs in two stages. During stage one, the wagering game unit 106 modifies critical data 108 and transmits the critical data 108 for storage in the non-volatile semiconductor memory 110. The wagering game unit 106 may modify the critical data 108 as a result of receiving money, receiving wagers, determining game results, etc. After the critical data 108 is safely stored in the non-volatile semiconductor memory 110, the wagering game unit 106 can continue conducting wagering games and/or processing critical data.

During stage two, the non-volatile semiconductor memory 110 transmits the critical data 108 for storage in a hard disk drive 112. The non-volatile semiconductor memory 110 can periodically copy its contents to the hard disk drive 112 or it can copy its contents in response to a command (e.g., a "flush" command from an operating system program—not shown). The non-volatile semiconductor memory 110 can avoid data loss by retaining a copy of the critical data 108 until the hard disk drive 112 acknowledges that the critical data 108 has been safely stored.

Because embodiments enable wagering game machines to store copies of critical data in non-volatile random access memory until the critical data has been successfully stored on hard disk drives, they may satisfy gaming regulators. Although FIG. 1 describes some embodiments, the following sections describe many other features and embodiments.

Example Wagering Game Machine Architectures

This section presents FIGS. 2-5, which describe a number of wagering game machine architectures in which critical data can be stored in non-volatile memories and hard disk drives. This section continues with a discussion of FIG. 2.

Figure 2:
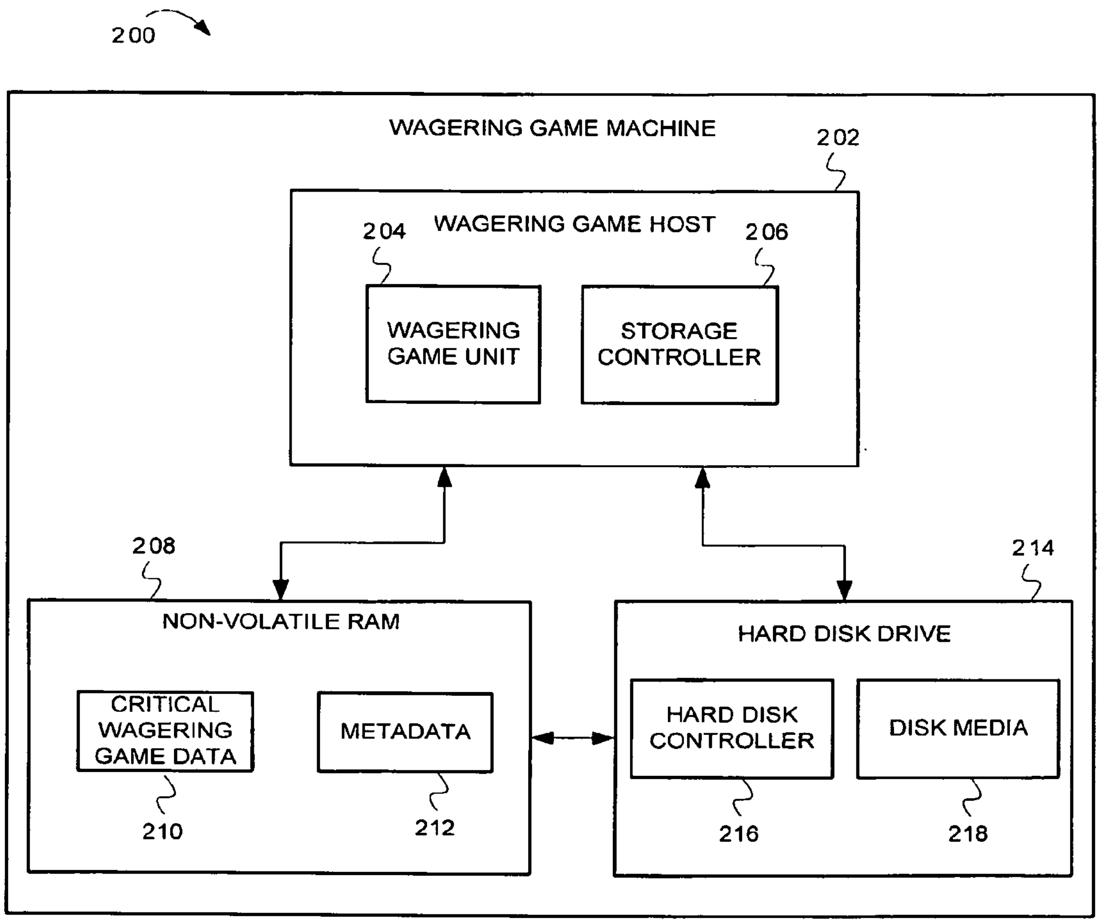
FIG. 2 is a block diagram illustrating a wagering game machine architecture that can store critical data in non-volatile memory and on a hard disk drive.

FIG. 2 is a block diagram illustrating a wagering game machine architecture that can store critical data in non-volatile memory and on a hard disk drive. In FIG. 2, the wagering game machine 200 includes a wagering game host 202, which includes a wagering game unit 204 and storage controller 206. The wagering game host 202 can include a processor and main memory (not shown) for executing software. In one embodiment, the wagering game unit 204 and storage controller 206 can include software components residing in the host's memory and executing on the host's processor. In other embodiments, the wagering game unit 204 and storage controller 206 can include hardware and/or other logic for performing operations described herein.

The wagering game host 202 is connected to a non-volatile random access memory (NVRAM) 208 and a hard disk drive 214. The NVRAM 208 can include flash memory, battery-backed SDRAM, or any other suitable NVRAM. The NVRAM unit 208 includes critical data 210 and metadata 212. In this and other embodiments described herein, metadata can include data describing the critical data or other data stored on a hard disk drive. For example, the metadata 212 can include locations at which portions of the critical data 210 are stored on the hard disk drive 214. As another example, the metadata can include data indicating when and by whom the critical data was accessed.

The hard disk drive 214 includes a hard disk controller 216 and disk media 218. In one embodiment, the disk media includes spinning platters. However, in another embodiment, the disk media 218 does not include "disks." Instead, the disk media 218 can includes solid state media, such as flash memory or battery-back DRAM.

In certain embodiments, after the wagering game unit 204 modifies critical data, it requests that the storage controller 206 store the critical data in the NVRAM 208. In one embodiment, the storage controller 206 can command the host 202 to store critical data in the NVRAM 208 and it can command the NVRAM 208 to copy critical data to the hard disk drive 214. In some embodiments, the process for storing critical data to the NVRAM 208 can be a synchronous process, whereas the process for copying critical data from NVRAM 208 to the hard disk drive 214 can be an asynchronous process. In one embodiment, the storage controller 206 can include a process or thread that asynchronously copies data from the NVRAM 208 to the hard disk drive 214.

Figure 3:
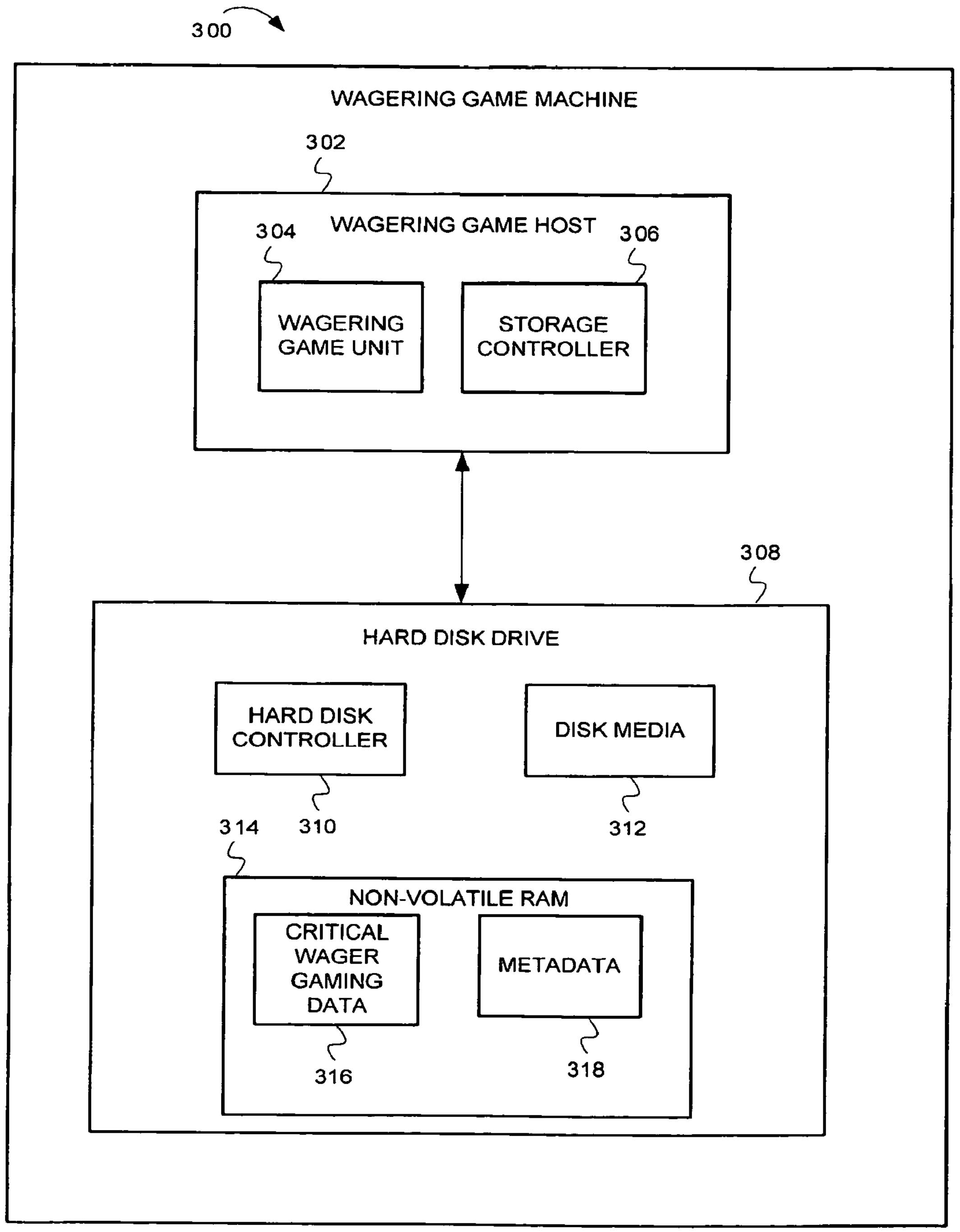
FIG. 3 is a block diagram illustrating a wagering game machine architecture including a hard disk drive that includes NVRAM, according to example embodiments of the invention.
Figure 4:
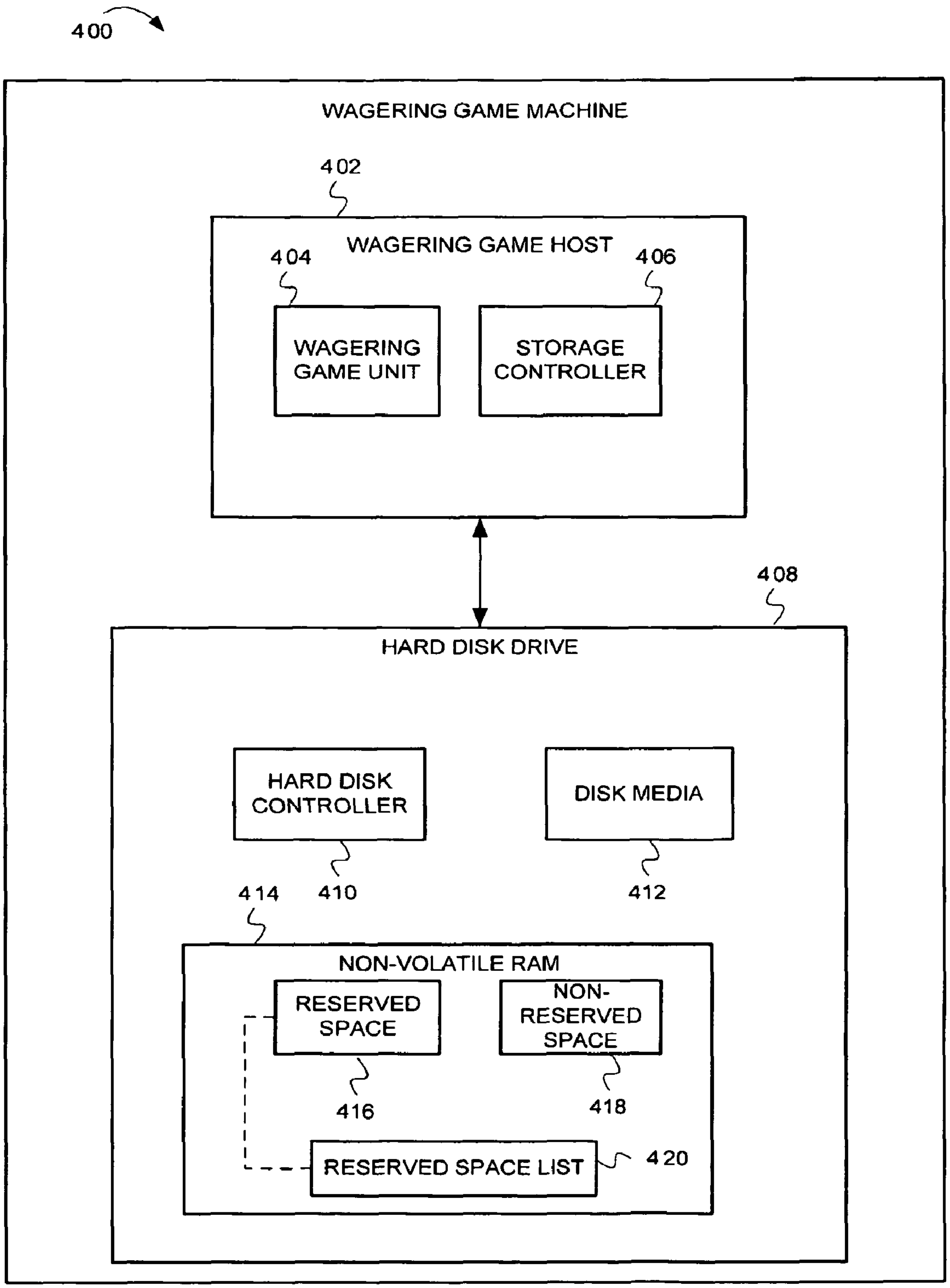
FIG. 4 is a block diagram illustrating a wagering game machine architecture including a hard disk drive that includes NVRAM in which space can be reserved for critical data, according to example embodiments of the invention.

While FIG. 2 describes embodiments in which the non-volatile memory and hard disk are separate, FIGS. 3 and 4 describe embodiments in which the hard disk drive includes the non-volatile memory.

FIG. 3 is a block diagram illustrating a wagering game machine architecture including a hard disk drive that includes NVRAM, according to example embodiments of the invention. In FIG. 3, the wagering game machine architecture 300 includes a wagering game host 302 similar to that of FIG. 2. The host 302 is connected to a hard disk drive 308, which includes a hard disk controller 310, disk media 312, and NVRAM 314. In one embodiment, the disk media 312 includes spinning platters, while in other embodiments it includes solid state media. The NVRAM 314 can store critical data 316 and metadata 318.

In one embodiment, the wagering game unit 304 can command the storage controller 306 to write critical data to a hard disk drive 308. In one embodiment, when the hard disk controller 310 processes critical data received from the host 302, the hard disk controller 310 first writes the critical data to the NVRAM 314. After writing the critical data to the NVRAM 314, the hard disk controller 310 can send to the host 302 an indication that the critical data has been safely stored. Additionally, if necessary, the hard disk controller 310 can write the critical data to the disk media 312. Some embodiments of the architecture 300 can operate differently.

FIG. 4 is a block diagram illustrating a wagering game machine architecture including a hard disk drive that includes NVRAM in which space can be reserved for critical data, according to example embodiments of the invention. In FIG. 4, the architecture 400 includes a wagering game host 402 that includes a wagering game unit 404, storage controller 406. The wagering game host 402 is connected to a hard disk drive 408.

The hard disk drive includes a hard disk controller 410, disk media 412, and NVRAM 414. In one embodiment, the disk media 412 includes spinning platters, while in other embodiments it includes solid state media. The NVRAM 414 includes a reserved space 416, non-reserved space 418, and reserved space list 420. In one embodiment, the reserved space 416 includes locations in the NVRAM 414 that may be periodically written to the disk media 412, but that will not be overwritten. The non-reserved space 418 includes NVRAM locations that may be written to the disk media 412 and then overwritten by different critical data. In one embodiment, the storage controller 406 can write certain critical data to the reserved space 416. The storage controller 406 and hard disk controller 410 can use the reserved space list 420 to track addresses that make up the NVRAM's reserved space 416. Because the storage controller 406 can determine when to store particular critical data in the reserved space 416, it can reduce latencies associated with reading the data from the hard disk drive 408 (e.g., latencies associated with rotating the disk media 412, moving the drive's read/write head, etc.). Additionally, it can reduce power consumption associated with spinning the disk media 412 and moving read/write heads (not shown).

This section continues with a discussion of yet another embodiment in which a wagering game machine can store critical data on a hard disk drive.

Figure 5:
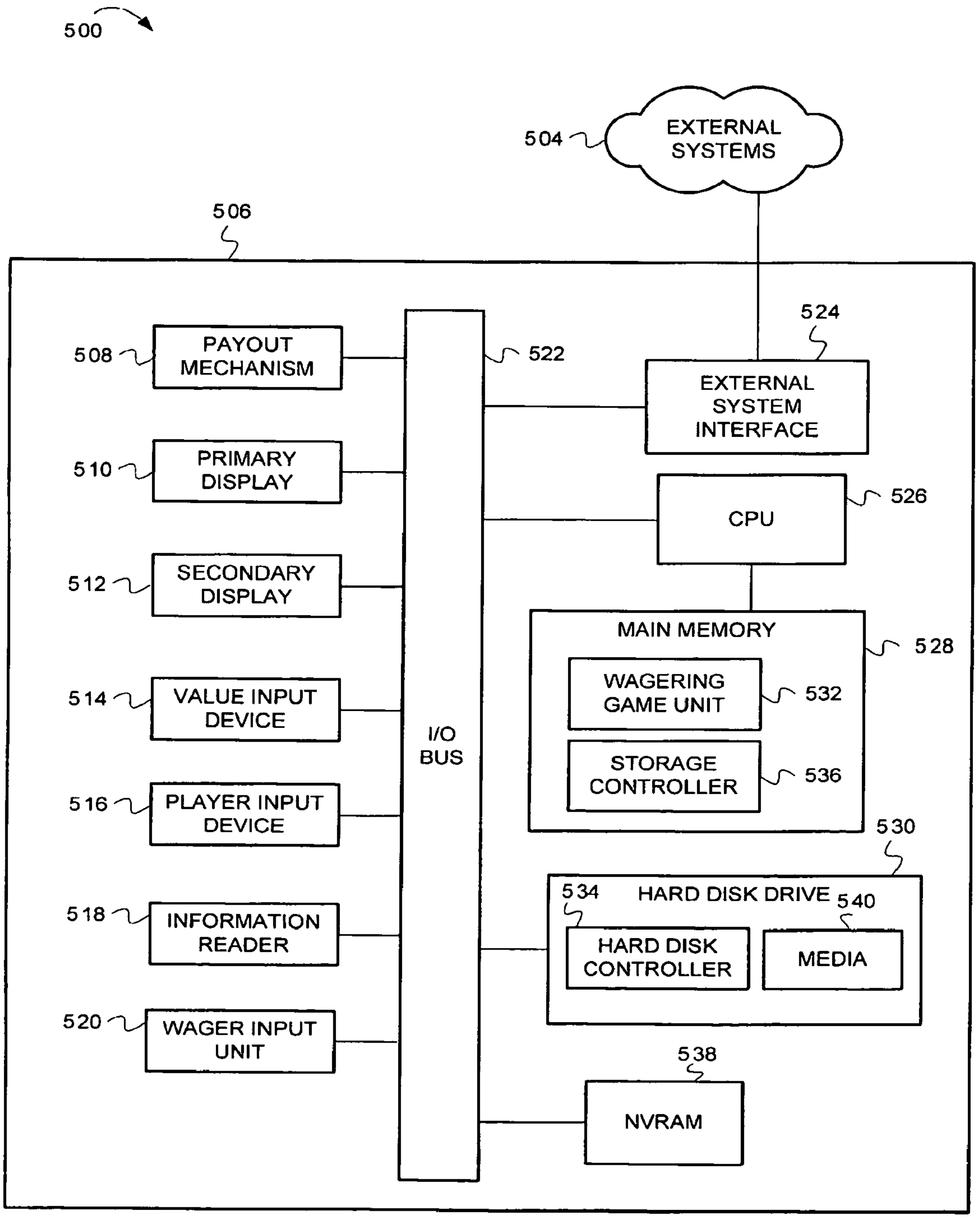
FIG. 5 is a block diagram illustrating a wagering game machine architecture including a hard disk drive, NVRAM, and peripheral devices, according to example embodiments of the invention.

FIG. 5 is a block diagram illustrating a wagering game machine architecture including a hard disk drive, NVRAM, and peripheral devices, according to example embodiments of the invention. FIG. 5 provides some additional details about the components that can be included in a wagering game machine.

In FIG. 5, the wagering game machine 506 includes a central processing unit (CPU) 526 connected to main memory 528, which includes a wagering game unit 532 and storage controller 536. In one embodiment, the wagering game unit 532 can present wagering games, such as video poker, video blackjack, video slots, video lottery, etc., in whole or part. The wagering game unit 532 can also process critical data, as described herein. The storage controller 536 can facilitate storage of critical data in the NVRAM 538 and the hard disk drive 530. In one embodiment, the storage controller 536 can be part of an operating system.

The CPU 526 is also connected to an input/output (I/O) bus 522, which facilitates communication between the wagering game machine's components. The I/O bus 522 is connected to a payout mechanism 508, primary display 510, secondary display 512, value input device 514, player input device 516, information reader 518, and wager input unit 520. The player input device 516 can include the value input device 514 to the extent the player input device 516 is used to place wagers. The I/O bus 522 is also connected to an external system interface 524, which is connected to external systems 504 (e.g., wagering game networks).

In one embodiment, the wagering game machine 506 can include additional peripheral devices and/or more than one of each component shown in FIG. 5. For example, in one embodiment, the wagering game machine 506 can include multiple external system interfaces 524 and multiple CPUs 526. In one embodiment, any of the components can be integrated or subdivided. Additionally, in one embodiment, the components of the wagering game machine 506 can be interconnected according to any suitable interconnection architecture (e.g., directly connected, hypercube, etc.).

In one embodiment, any of the components of the wagering game machine 506 and the architectures described above can include hardware, firmware, and/or instructions stored on machine readable media (i.e., software). Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations performed by some embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel.

This section continues with a discussion of operations performed by embodiments of a wagering game host.

Writing Critical Data to Non-Volatile Memory

Figure 6:
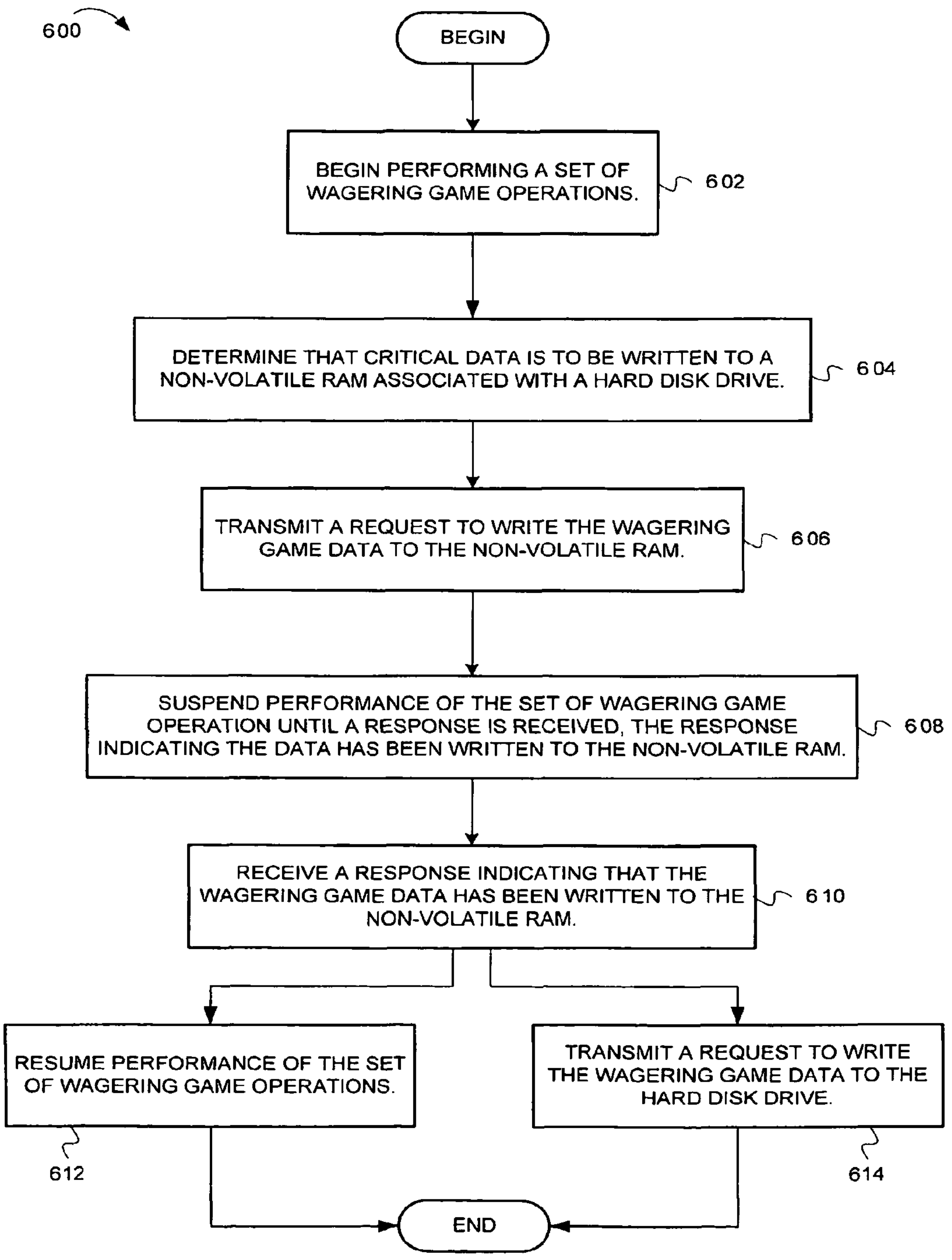
FIG. 6 is a flow diagram illustrating operations for storing critical data in a wagering game machine, according to example embodiments of the invention.

FIG. 6 is a flow diagram illustrating operations for storing critical data in a wagering game machine, according to example embodiments of the invention. The flow diagram 600 will be described with reference to the embodiments shown in FIGS. 2 and 3. The flow begins at block 602.

At block 602, a wagering game host's wagering game unit begins performing a set of wagering game operations. For example, the wagering game unit 204/304 performs operations associated with receiving monetary value, processing monetary wagers, and presenting a wagering game, such as video slots, video black jack, video poker, etc. Some of the operations process critical data, such as data relating to money received, wagers made, game outcomes, etc. The flow continues at block 604.

At block 604, the wagering game unit determines that critical data has been modified. For example, the wagering game unit 204/304 determines that it has modified critical data associated with monetary values, received wagers, wagering game results, etc. The flow continues at block 606.

At block 606, the wagering game host's storage controller writes the critical data to non-volatile memory. In one embodiment, after a wagering game unit modifies critical data in volatile memory (e.g., main memory), it asks the storage controller to write the modified critical data in non-volatile memory. In different embodiments, storage controllers can store critical data in different ways. For example, in one embodiment of the architecture 200, the storage controller 206 can write the critical data to the NVRAM 208. Alternatively, in an embodiment of the architecture 300, the storage controller 306 can write the critical data directly to the hard disk drive 308. The flow continues at block 608.

At block 608, the wagering game unit suspends performance of the set of wagering game operations until it receives a response indicating that the critical data has been written to non-volatile memory. In some embodiments, because the wagering game operations are suspended, the wagering game unit 204/304 will not make additional modifications to critical data until the current modifications have been safely stored in non-volatile memory (e.g., NVRAM 208 or NVRAM 314). The flow continues at block 610.

At block 610, the wagering game unit receives an indication that the critical data has been written to non-volatile memory. For example, the storage controller 206/306 determines that the critical data has been safely written to non-volatile memory (e.g., NVRAM 208 or hard disk drive 308) and notifies the wagering game unit 204/304. In one embodiment, the storage controller 206/306 receives a signal from the non-volatile memory after critical data has been stored. The storage controller 206/306 can then notify the wagering game unit 204/304 that the write operations are complete. The flow continues in parallel at blocks 612 and 614.

At block 612, the wagering game unit resumes performance of the set of wagering game operations. For example, the wagering game unit 204/304 resumes operations associated with receiving monetary value, processing monetary wagers, and presenting a wagering game. From block 612, the flow ends.

At block 614, the wagering game host's storage controller copies critical data to a hard disk drive. For example, the storage controller 206 copies the critical data 210 to the hard disk drive 214. In one embodiment, after writing the critical data to the hard disk drive 214, the storage controller 206 can write new critical data to memory locations occupied by data that has been written to the hard disk drive 214.

In one embodiment (e.g., an embodiment of FIG. 3's architecture 300), the storage controller 306 does not perform the operation at block 614. In such an embodiment, because the NVRAM 314 is part of the hard disk drive 308, the hard disk controller 310 (not the storage controller 306) copies critical data from the NVRAM 314 to the disk media 312.

From block 614, the flow ends.

This section continues with an alternative technique for writing critical data in a wagering game machine. While FIG. 6 describes embodiments that suspend wagering game operations until modified critical data has been stored in non-volatile memory, this section continues with embodiments that do not suspend wagering game operations. A discussion of FIG. 7 is next.

Figure 7:
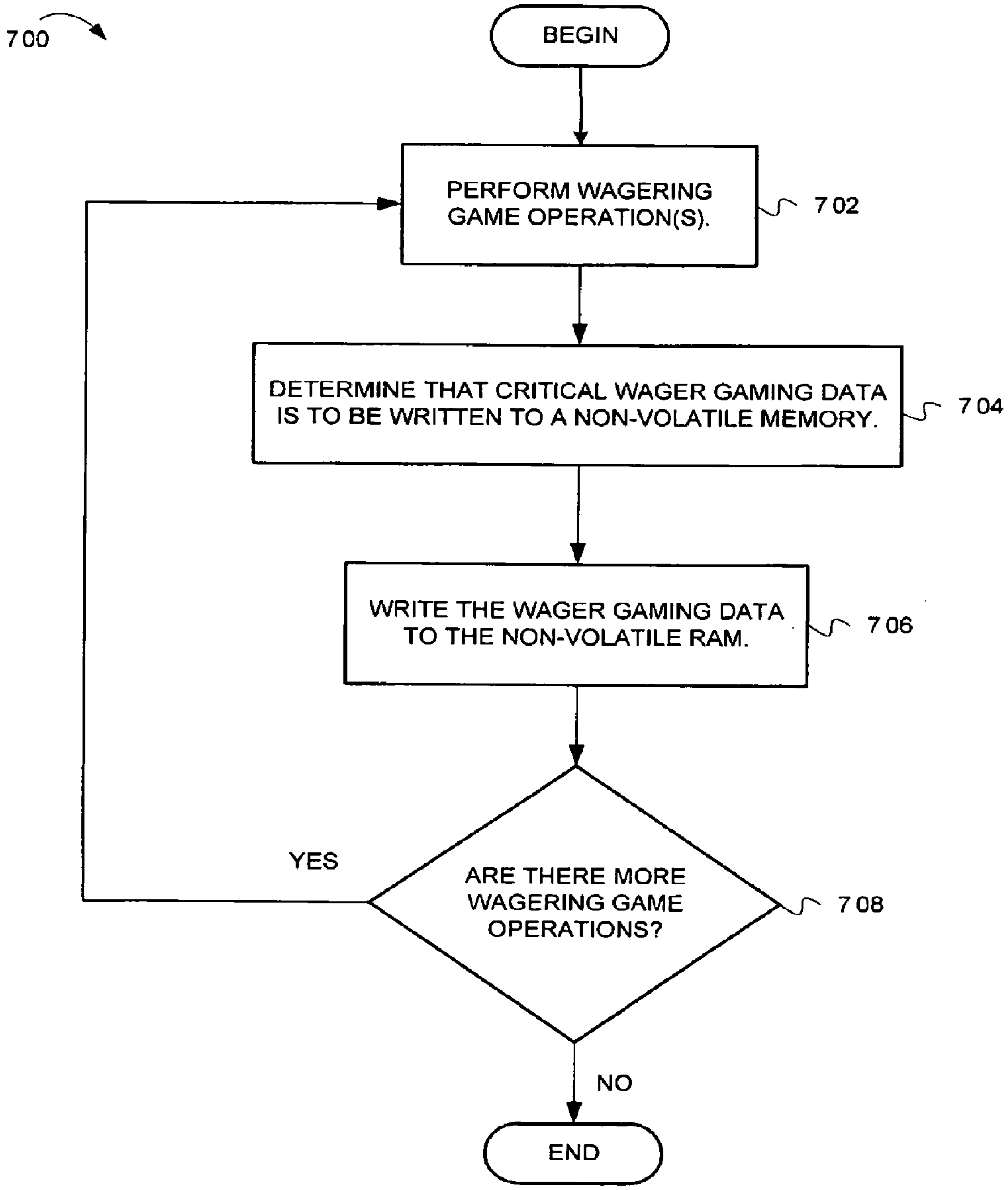
FIG. 7 is a flow diagram illustrating operations for writing critical data to non-volatile memory in a wagering game machine, according to example embodiments of the invention.

FIG. 7 is a flow diagram illustrating operations for writing critical data to non-volatile memory in a wagering game machine, according to example embodiments of the invention. The flow diagram 700 will be described with reference to the example architectures shown in FIGS. 2 and 3. The flow begins at block 702.

At block 702, a wagering game host's wagering game unit performs wagering game operations. For example, the wagering game unit 204/304 presents a wagering game, such as slots, video poker, video blackjack, etc. the flow continues at block 704.

At block 704, the wagering game unit determines that critical data is to be written to non-volatile memory. For example, the wagering game unit 204/304 determines that it has modified critical data and that the modified critical data should be written to non-volatile memory. The flow continues at block 706.

At block 706, the wagering game host's storage controller writes the critical data to non-volatile memory. In one embodiment of the architecture 200, the storage controller 206 writes modified critical data to the NVRAM 208. After writing the critical data to the NVRAM 208, the storage controller 206 can periodically or conditionally copy the contents of the NVRAM 208 to the hard disk drive 214.

In an embodiment of the architecture 300, the wagering game unit 304 can write modified critical data directly to the hard disk drive 308. In such an embodiment, the hard disk drive 308 can first write the critical data to its NVRAM 314 and then it can copy the critical data to its disk media 312. In some embodiments, the hard disk drive 308 may never write the critical data to the disk media 312.

In some embodiments, the storage controller 206/306 can compress the critical data before writing it to the non-volatile memory. The storage controller 206/306 can employ any suitable compression technique, such as Deflate, LZO, LZRW1, etc. The flow continues at block 708.

At block 708, the wagering game unit determines whether there are more wagering game operations to perform. If there are no more wagering game operations to perform, the flow ends. Otherwise, the flow continues at block 702.

Although the operations of FIGS. 6 and 7 have been described vis-à-vis critical data, some embodiments do not distinguish between critical data and noncritical data. Thus, some embodiments can perform the operations of FIGS. 6 and 7 on either critical or noncritical data. That is, some embodiments can perform the operations of FIGS. 6 and 7 when processing data that does not bear on wagering game results, payouts, system integrity, and other critical operations. This section continues with a discussion of how some embodiments of the wagering game host can write data to a portion of a hard disk drive's NVRAM.

Writing Critical Data to a Hard Disk Drive's Reserved Space

Figure 8:
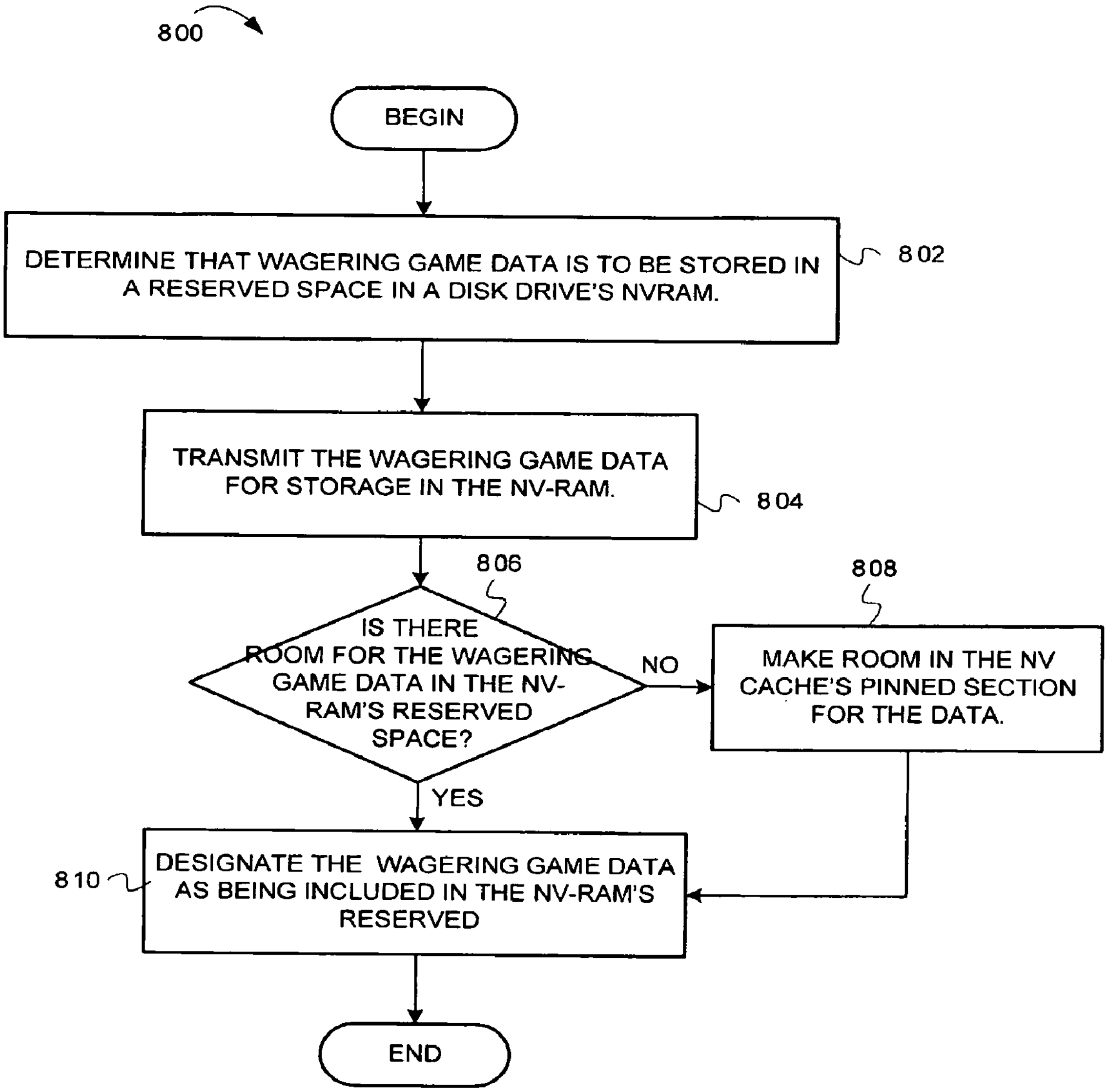
FIG. 8 is a flow diagram illustrating operations for writing data to a reserved space in a hard disk drive's non-volatile random access memory, according to example embodiments of the invention.

In some embodiments, a wagering game host can write data to space reserved in a hard disk drive's NVRAM. For example, in an embodiment of the architecture 400, the wagering game host 402 can write data into the reserved space 416, where data in the reserved space 416 will not be overwritten or flushed to the disk media 412. FIG. 8 describes this in more detail.

FIG. 8 is a flow diagram illustrating operations for writing data to a reserved space in a hard disk drive's non-volatile random access memory, according to example embodiments of the invention. The flow 800 will be described with reference to the architecture shown in FIG. 4. The flow begins at block 802.

At block 802, a wagering game host determines that wagering game data is to be stored in a reserved space in a disk drive's NVRAM. For example, the wagering game unit 404 determines that a particular data set will be used frequently in the course of presenting a wagering game or other operations. The data set can include critical data or noncritical data. The flow continues at block 804.

At block 804, the wagering game host provides the data set to a hard disk drive. For example, the storage controller 406 stores the data set in the hard disk drive 408. In one embodiment, the hard disk controller 410 can receive the data set and write it to memory locations in the non-reserved space 418. Later, the hard disk controller 410 may mark those memory locations as being part of the reserved space 416. The flow continues at block 806.

At block 806, the hard disk drive determines whether there is room for the data set in its reserved space. For example, the hard disk controller 410 determines whether the reserved space 416 has room for the data set. If there is room in the reserved space, the flow continues at block 810. Otherwise, the flow continues at block 808.

At block 808, the hard disk drive makes room for the data set in its reserved space. In one embodiment, the hard disk controller 410 can expand the size of the reserved space 416 to accommodate the data set. For example, it can add addresses to the reserved space list 420. The flow continues at block 810.

At block 810, the hard disk drive includes the data set in the reserved space of its NVRAM. In one embodiment, the hard disk controller 410 marks addresses at which the data set is stored as being part of the reserved space 416. Alternatively, the hard disk controller 410 can copy the data set into memory locations in the reserved space 416. From block 810, the flow ends.

Although the discussion of FIG. 8 describes several embodiments, there are many other techniques for writing data to a reserved space in a hard disk drive's NVRAM. However, irrespective of how data is written to a hard disk drive's reserved space, many of the results are similar. For example, data in the reserved space 416 can be read and written without expending time and power spinning the disk media 412 and moving read/write heads (not shown). This section continues with a discussion about operations for rolling back data values.

Rollback Operations

Some embodiments can perform operations for maintaining rollback variables, which enable wagering game machines to recover critical data. Some embodiments may perform rollback operations to restore critical data after a power failure or to restore critical data after component failures (e.g., hard disk drive failure). This section continues with a discussion of operations for maintaining rollback variables.

Figure 9:
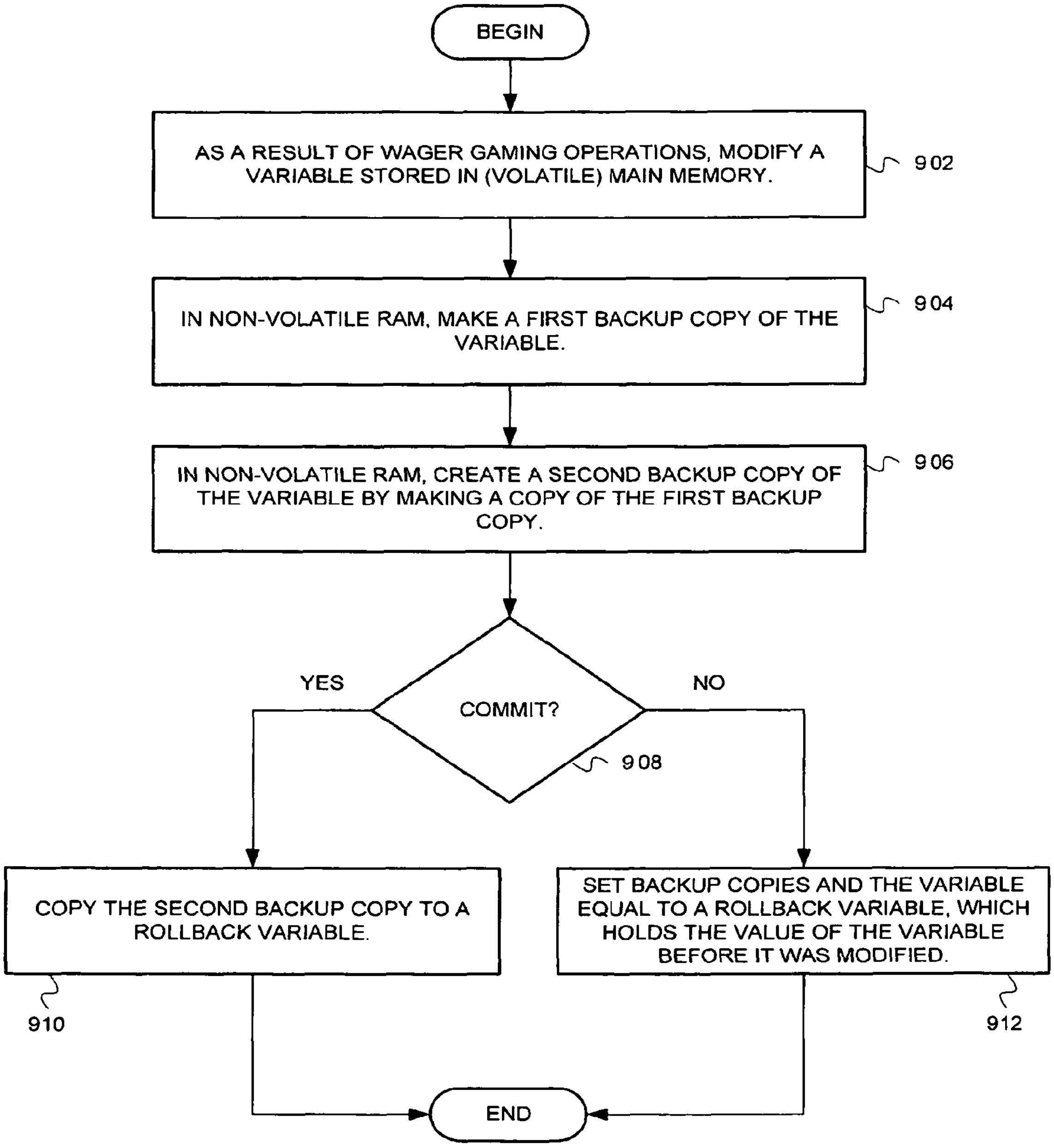
FIG. 9 is a flow diagram illustrating operations for maintaining rollback variables, according to example embodiments of the invention.

FIG. 9 is a flow diagram illustrating operations for maintaining rollback variables, according to example embodiments of the invention. The flow diagram 900 begins at block 902.

At block 902, as a result of wagering game operations, the wagering game unit 204 modifies critical data stored in volatile memory (e.g. main memory). At this point, the new value is stored only in volatile memory. However, in the following operations, the wagering game machine 200 will maintain three copies of the new value in NVRAM. The flow continues at block 904.

At block 904, the storage controller 206 creates a first backup copy of the critical data in NVRAM 208. In one embodiment, after making the backup copy, the storage controller 206 can write the critical data to the hard disk drive 214.

After the backup copy is made, if power is lost, the critical data can be restored using the first backup copy, as it is stored in NVRAM. Also, if power is lost while performing the flow 900, some embodiments can resume operations where the last backup value was stored. For example, if the wagering game host 202 loses power after block 904, it can resume at block 906 because the first backup copy is stored in NVRAM 208. The flow continues at block 906.

At block 906, the storage controller 206 creates a second backup copy of the critical data by making a copy of the first backup copy. At this point, if power is lost, the wagering game host 202 can use either the first or second backup copy to restore the variable's value. After making the second backup copy, the storage controller 206 can write the critical data to the hard disk drive 214. The flow continues at block 908.

At block 908, the wagering game unit 204 determines whether it wants to "commit" the modifications to the critical data. If the wagering game unit 204 wants to commit the modifications, the flow continues at block 910. Otherwise, the flow continues at block 912.

At block 910, the storage controller 206 copies the second backup copy to a rollback variable. In one embodiment, the rollback variable is yet a third variable in the NVRAM 208 for storing modifications made at block 902. Like the backup copies, the rollback variable can be used to restore the variable's value after power loss, component failure, etc. In one embodiment, after the rollback variable is modified (i.e., set equal to the second backup copy), the wagering game unit 204 can continue modifying critical data. From block 910, the flow ends.

At block 912, in the case where the storage controller 206 does not commit the modification, the storage controller 206 sets the first and second backup copies equal to a rollback variable, where the rollback variable holds the value of the critical data before it was modified. As a result, the storage controller 206 is "rolling back" the critical data to an earlier value. From block 912, the flow ends.

Hard Disk Drive Operations

As described above, some wagering game machines include hard disk drives that store wagering game data (critical data and noncritical data) in NVRAM, where the wagering game data may not ever be stored on disk media. This section continues with a discussion of how some wagering game machines store wagering game data.

Figure 10:
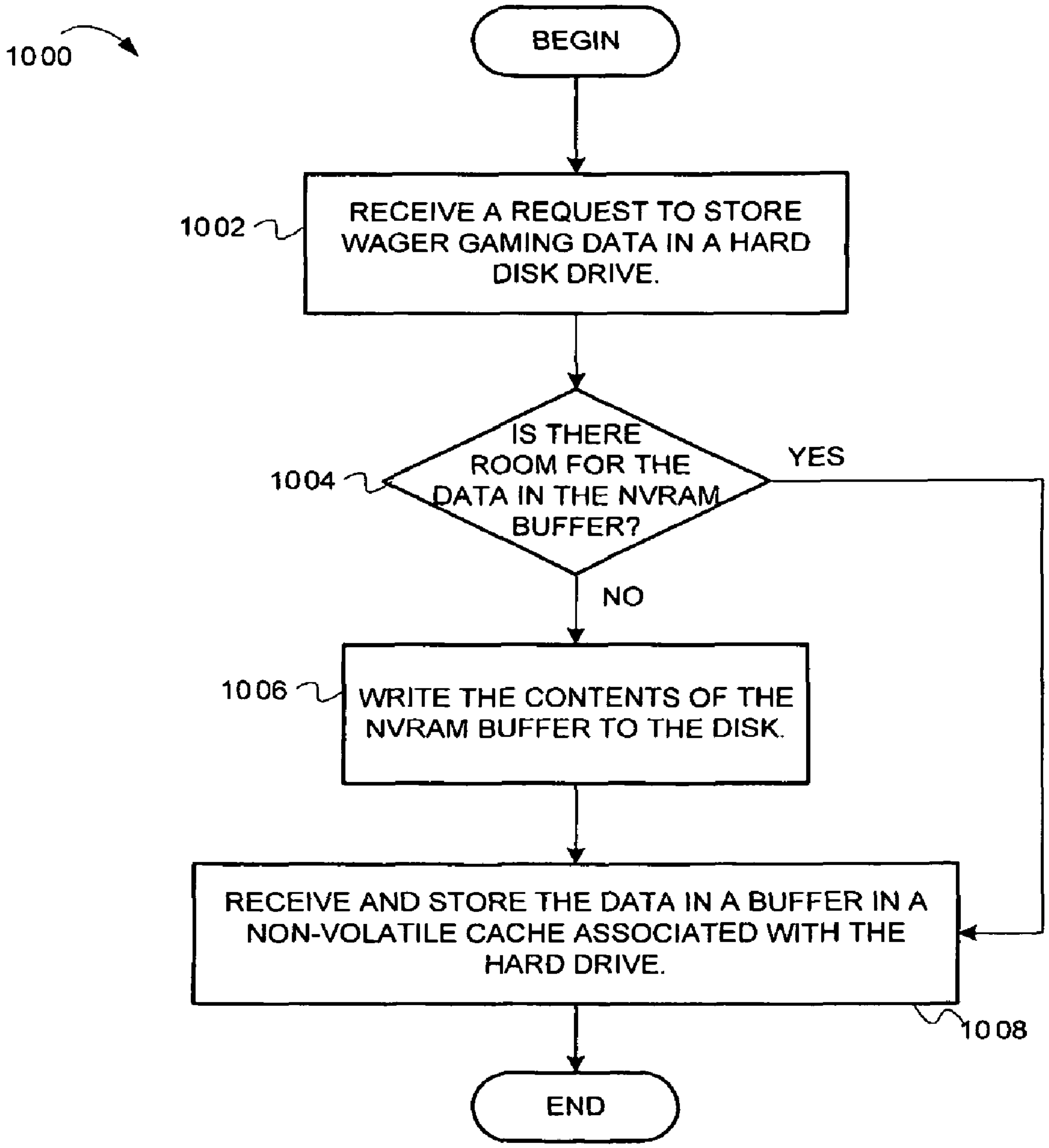
FIG. 10 is a flow diagram illustrating operations for receiving and storing wagering game data in a wagering game machine's hard disk drive, according to example embodiments of the invention.

FIG. 10 is a flow diagram illustrating operations for receiving and storing wagering game data in a wagering game machine's hard disk drive, according to example embodiments of the invention. The flow diagram 1000 will be described with reference to the architectures shown in FIG. 4. The flow 1000 begins at block 1002.

At block 1002, the hard disk drive 408 receives from the wagering game host 402 a request to store wager gaming data. In one embodiment, the hard disk receives the request as a result of a hard disk write operation performed by the storage controller 406. The flow continues at block 1004.

At block 1004, the hard disk controller 410 determines whether there is room in the NVRAM 414 for the wager gaming data. If there is room in the NVRAM, the flow continues at block 1008. Otherwise, the flow continues at block 1006.

At block 1006, the hard disk controller 410 writes some of the contents of the NVRAM 414 to the disk media 412. As a result, the NVRAM 414 will have room to store the wager gaming data. The flow continues at block 1008.

At block 1008, the hard disk controller 410 directs receipt and storage of the wager gaming data in the hard disk's NVRAM 414. From block 1008, the flow ends.

The next section describes example wagering game machines and wagering game networks in which embodiments of the invention can be included.

Example Wagering Game Machines

Example Wagering Game Machine

Figure 11:
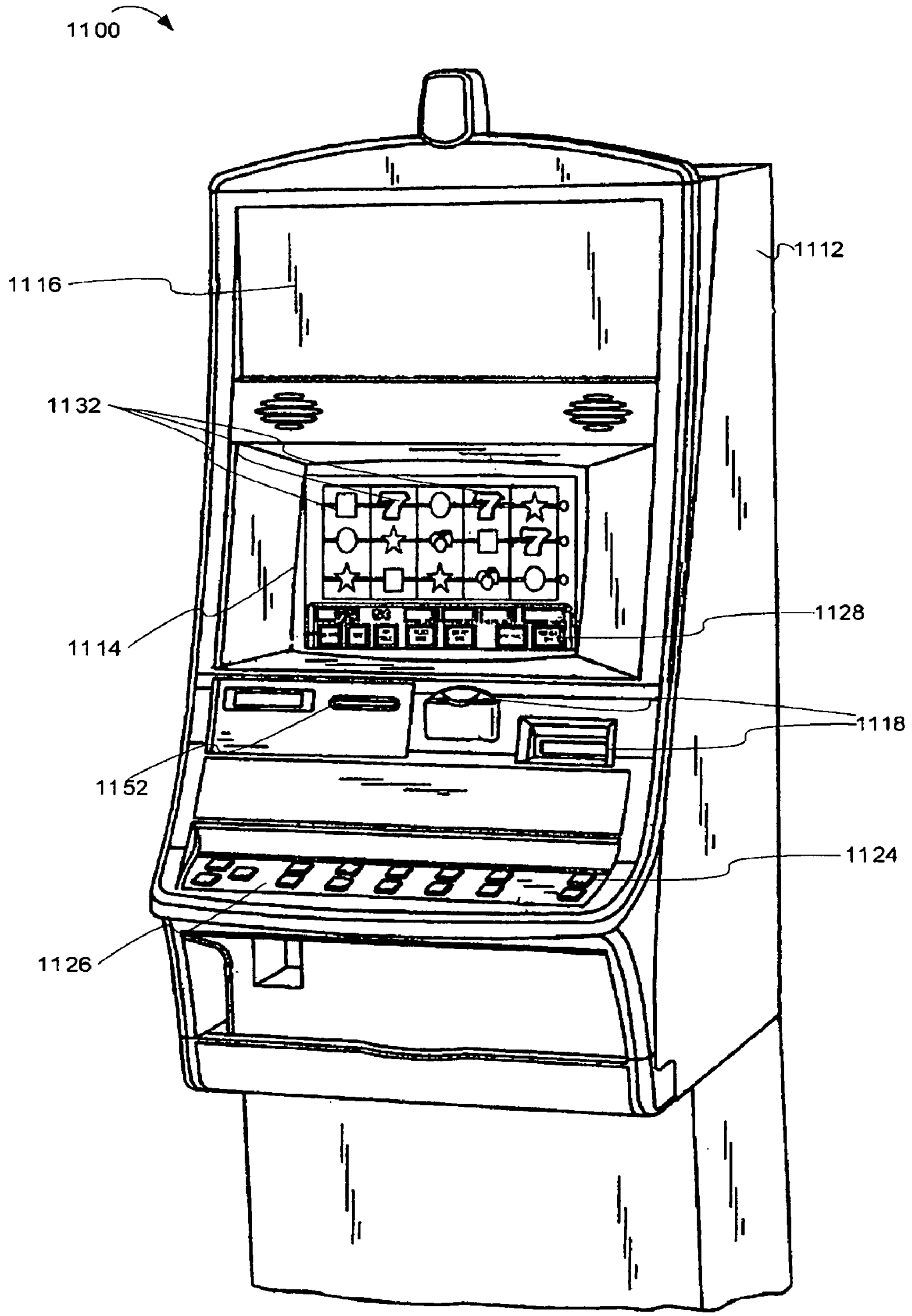
FIG. 11 is a perspective view of a wagering game machine, according to example embodiments of the invention.

FIG. 11 is a perspective view of a wagering game machine, according to example embodiments of the invention. Referring to FIG. 11, a wagering game machine 1100 is used in gaming establishments, such as casinos. According to embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted under the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bartop model, mobile handheld model, or workstation console model.

A player begins playing a basic wagering game by making a wager via the value input device 1118. The player can initiate play by using the player input device's buttons or touch screen 1128. The basic game can include arranging a plurality of symbols along a payline 1132, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interface. In some embodiments, the information reader 1152 can be used to award complimentary services, restore game assets, track player habits, etc.

In some embodiments, the wagering game machine 1100 can include an NVRAM separate from a hard disk drive, where the NVRAM can store critical data, as described above. Other embodiments include a hard disk drive that includes an NVRAM area for storing wager gaming data, as described above.

Example Wagering Game Network

Figure 12:
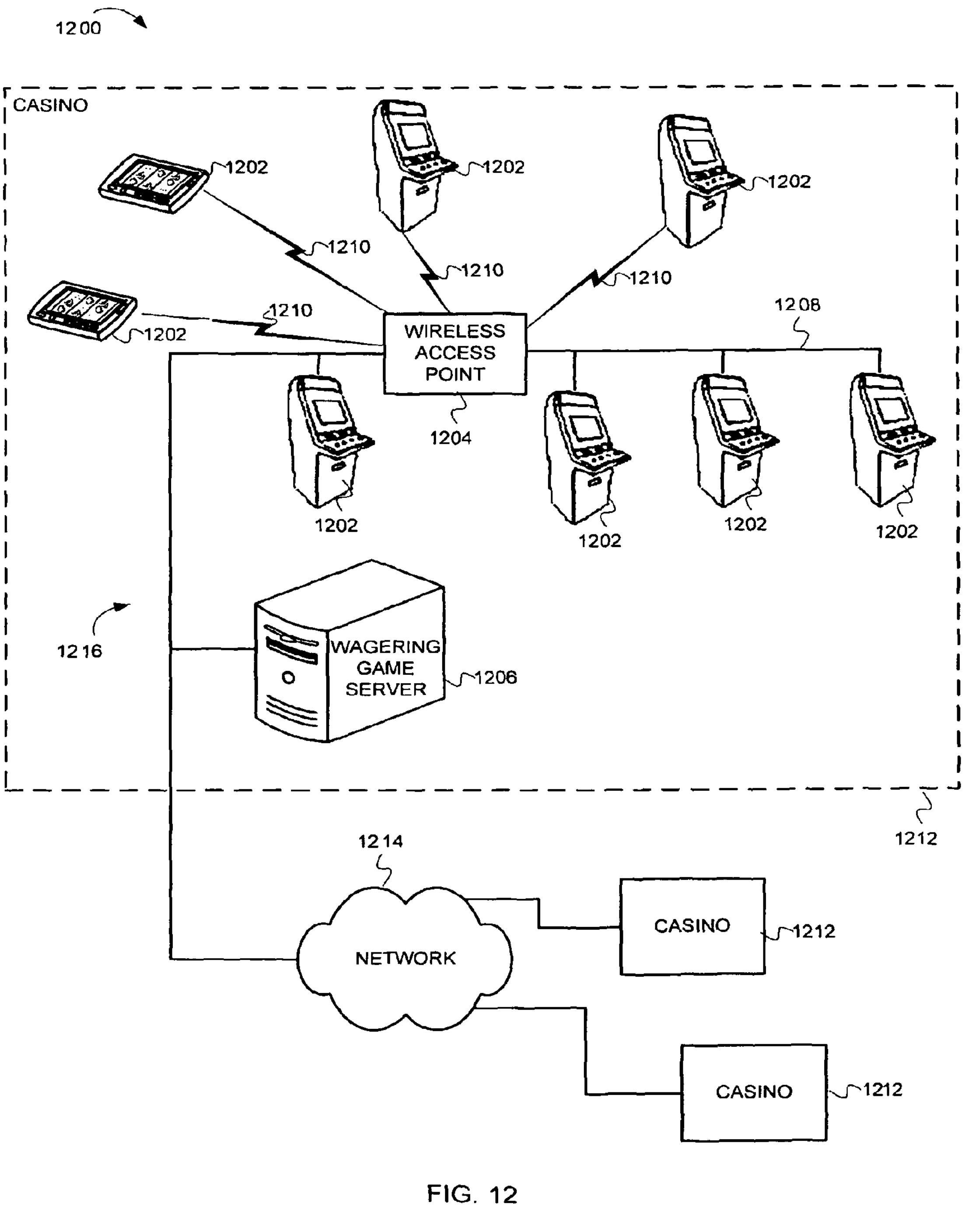
FIG. 12 is a block diagram illustrating a wagering game network, according to example embodiments of the invention.

FIG. 12 is a block diagram illustrating a wagering game network, according to example embodiments of the invention. As shown in FIG. 12, the wagering game network 1200 includes a plurality of casinos 1212 connected to a communications network 1214.

Each of the plurality of casinos 1212 includes a local area network 1216, which includes a wireless access point 1204, wagering game machines 1202, and a wagering game server 1206 that can serve wagering games over the local area network 1216. As such, the local area network 1216 includes wireless communication links 1210 and wired communication links 1208. The wired and wireless communication links can employ any suitable connection technology, such as Bluetooth, 802.11, Ethernet, public switched telephone networks, SONET, etc. In one embodiment, the wagering game server 1206 can serve wagering games and/or distribute content to devices located in other casinos 1212 or at other locations on the communications network 1214.

The wagering game machines 1202 and wagering game server 1206 can include hardware and machine-readable media including instructions for performing the operations described herein. In some embodiments, the wagering game machines 1202 and wagering game server 1206 include NVRAM and hard disk drives for storing critical data, as described above. In other embodiments, the wagering game machines 1202 and wagering game server 1206 include hard disk drives that include NVRAM devices for storing wager gaming data (e.g., critical data and non-critical data), as described above.

The wagering game machines 1202 described herein can take any suitable form, such as floor standing models, handheld mobile units, bartop models, workstation-type console models, etc. Further, the wagering game machines 1202 can be primarily dedicated for use in conducting wagering games; or can include non-dedicated devices, such as mobile phones, personal digital assistants, personal computers, etc. In one embodiment, the wagering game network 1200 can include other network devices, such as accounting servers, wide area progressive servers, player tracking servers, and/or other devices suitable for use in connection with embodiments of the invention.

General

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as falling within the inventive subject matter, which is set forth in the following claims.

The invention claimed is:

1. A method comprising:

beginning performance of wagering game operations;

determining that wagering game data is to be written to a non-volatile random access memory (NVRAM) associated with a hard disk drive;

writing the wagering game data to the NVRAM;

suspending performance of the wagering game operations until a response is received, wherein the response indicates the wagering game data has been written to the NVRAM;

receiving the response;

resuming performance of the wagering game operations; and copying the wagering game data from the NVRAM to the hard disk drive.

2. The method of claim 1, further comprising:

compressing the wagering game data before writing the wagering game data to the NVRAM.

3. The method of claim 1, wherein the wagering game operations are selected from the group consisting of receiving a wager associated with a wagering game, generating a random outcome associated with a wagering game, and presenting a bonus portion of a wagering game.

4. The method of claim 1, wherein the NVRAM is included in the hard disk drive.

5. The method of claim 1, wherein the NVRAM resides on a motherboard inside wagering game machine.

6. The method of claim 1, wherein the copying the wagering game data to the hard disk drive occurs during performance of a set of wagering game operations.

7. The method of claim 1, wherein the wagering game operations include operations for presenting a wagering game upon which monetary value can be wagered.

8. An apparatus comprising:

a wagering game unit configured to begin presentation of a wagering game, to request that wagering game data be stored, to wait for an indication that the wagering game data has been stored, and, after receipt of the indication, to resume presentation of the wagering game;

a non-volatile random access memory (NVRAM) configured to store the wagering game data;

a hard disk drive configured to store the wagering game data; and a storage controller configured to direct storage of the wagering game data in the NVRAM in response to the wagering game unit's request, to provide to the wagering game unit an indication that the wagering game data has been stored, and to direct storage of the wagering game data to the hard disk drive.

9. The apparatus of claim 8, wherein the NVRAM is included on the hard disk drive.

10. The apparatus of claim 8, wherein the storage controller is further configured to compress the wagering game data.

11. The apparatus of claim 8, wherein the storage controller is configured to store the wagering game data in the NVRAM using a synchronous process, and wherein the storage controller is configured to store the wagering game data in the hard disk drive using an asynchronous process.

12. The apparatus of claim 8, wherein the storage controller is configured to store the wagering game data in the hard disk drive using a background process.

13. The apparatus of claim 8, wherein the storage controller is configured to maintain rollback variables in the NVRAM, wherein the rollback variables can be used to recover wagering game data.

14. A wagering game machine comprising:

a wagering game unit to present a wagering game upon which monetary value can be wagered; and a hard disk drive to store wagering game data associated with the wagering game, the hard disk drive including a non-volatile random access memory (NVRAM), wherein the NVRAM includes, a reserved space to store a portion of the wagering game data; and a non-reserved space to store another portion of the wagering game data;

a storage unit configured to determine the portion of the wagering game data stored in the reserved space, wherein wagering game data in the reserved space will not be overwritten unless directed by the storage unit.

15. The wagering game machine of claim 14, wagering game data in the non-reserved space can be overwritten by the wagering game unit.

16. The wagering game machine of claim 14, wherein the NVRAM includes one or more of flash memory or battery backed SDRAM.

17. The wagering game machine of claim 14, the hard disk drive further comprising one or more disk media to store another portion of the wagering game data, wherein the hard disk drive is further configured to retrieve wagering data from the reserved space without spinning the disk media.

18. The wagering game machine of claim 14, wherein the storage unit is further configured to retrieve some of the portion of wagering game data stored in the reserved space.

19. The wagering game machine of claim 14, wherein the storage unit maintains rollback variables in the NVRAM.

* * * * *

UNITED STATES PATENT AND TRADEMARK OFFICE

CERTIFICATE OF CORRECTION

PATENT NO. : 8,123,621 B2
APPLICATION NO. : 12/376501
DATED : February 28, 2012
INVENTOR(S) : Jorge L. Shimabukuro et al.

It is certified that error appears in the above-identified patent and that said Letters Patent is hereby corrected as shown below:

In column 1, line 22, after "2006," insert -- 2007, --.

In column 5, line 37, delete "(U/O)" and insert -- (I/O) --, therefor.

In column 6, line 32, delete "black jack," and insert -- blackjack, --, therefor.

In column 12, line 46, delete "games;" and insert -- games, --, therefor.

In column 14, line 47, in Claim 17, after "wagering" insert -- game --.

Signed and Sealed this
Twelfth Day of June, 2012

David J. Kappos

David J. Kappos
*Director of the United States Patent and Trademark Office*